United States Patent [19]

Doi

[11] Patent Number: 4,865,423
[45] Date of Patent: Sep. 12, 1989

[54] METHOD FOR GENERATING IMAGES

[75] Inventor: Akio Doi, Tokyo, Japan

[73] Assignee: International Business Machines Corporation, Armonk, N.Y.

[21] Appl. No.: 215,007

[22] Filed: Jul. 5, 1988

[30] Foreign Application Priority Data

Jul. 16, 1987 [JP] Japan ................. 62-176099

[51] Int. Cl.$^4$ ............................................. G02B 27/00
[52] U.S. Cl. ....................... 350/320; 356/2; 358/231
[58] Field of Search ............... 350/320, 321, 322; 356/2, 154; 358/12, 21 R, 231, 232, 294

[56] References Cited

U.S. PATENT DOCUMENTS

| | | | |
|---|---|---|---|
| 4,126,395 | 11/1978 | Ross et al. ............................ | 356/2 |
| 4,185,918 | 1/1980 | Di Matteo et al. .................. | 356/2 |
| 4,654,872 | 3/1987 | Hisano et al. ....................... | 356/2 |

FOREIGN PATENT DOCUMENTS 61-139890 6/1986 Japan .

OTHER PUBLICATIONS

Whitted, Turner "An Improved Illumination Model for Shaded Display", *Communication of the ACM*. vol. 23, No. 6, pp. 343–349, Jun. 1980.
Fugimoto et al., "Arts: Accelerated Ray-Tracing System", IEEE CG&A, vol. 6, No. 4, pp. 16–26, Apr. 1986.

*Primary Examiner*—Bruce Y. Arnold
*Assistant Examiner*—Loha Ben
*Attorney, Agent, or Firm*—Marc D. Schechter

[57] ABSTRACT

This invention relates to a method for generating images by using a ray-tracing method. The method for generating images according to the invention registers only a cell containing the surface of an object among cells that are obtained by dividing the region containing the object to be displayed. The calculation of intersection points is performed only for rectangular parallelepipeds in which the surface exists. Thus it is possible to reduce the time required for displaying the object.

12 Claims, 8 Drawing Sheets

METHOD FOR GENERATING IMAGES

BACKGROUND OF THE INVENTION

This invention relates to a method for generating images by using a ray-tracing method.

First, overview is described for the ray-tracing method, for example, stated by Turner Whitted in "An Improved Illumination Model for Shaded Display", Com. of the ACM, June 1980, Vol. 23, No. 6. In the ray-tracing method, as shown in FIG. 2, ray L (line of sight) emitted from viewpoint 12 is supposed for each pel (i, j) on screen 10 (matched with a plane of projection for convenience of the description), and the surfaces of objects intersecting the ray are searched. Of objects 14 and 16 intersecting ray L, the first seen is object 14, whose surface is closer to the viewpoint.

Now, as shown in FIG. 3, it is assumed that, based on optical properties of an area of the outer surface of object 14 which ray L encounters, a reflected ray $S_1$ and refracted ray $T_1$ originates from intersection point 18. In this case, a search is made for each of ray $S_1$ and $T_1$ to determine whether it intersects any surface of any object or not. In the example of FIG. 3, ray $S_1$ intersects object 20 at intersection point 22. If reflected ray $S_2$ and refracted ray $T_2$ originating from intersection point 22 exist, a search is made for each of them to determine whether it intersects an object surface or not. On the other hand, ray $T_1$ intersects object 14 again at intersection point 24. If, owing to optical properties of an area of the internal surface of object 14 where intersection point 24 exists, a reflected ray originating from intersection point 24 cannot exist, or if the reflected ray is too weak for consideration, a search is made only for refracted ray $T_3$ to determine whether it intersects an object surface or not. Thus, once an intersection point between a line of sight and a surface of an object to be displayed is found, tracing of a ray originating from the intersection point is sequentially performed. In FIG. 3, $N_1$, $N_2$ and $N_3$ represent normal vectors at intersection points 18, 22 and 24, respectively.

Now, although the above-mentioned tracing of a ray may be almost infinitely repeated, it is usually discontinued appropriately, taking into consideration the time required for generating an image. For convenience of description, in the example of FIG. 2, a search is not performed for rays $S_2$, $T_2$ and $T_3$ to determine whether there are intersection points between them and the surfaces of the object to be displayed.

Now, color, brightness, etc., of intersection point 18, of course, reflect attributes of the external surfaces of object 20 at intersection point 22 and those of the internal surfaces of object 14 at intersection point 24 as well as attributes of the external surfaces of object 14 at intersection point 18. Examples of attributes of an object are color specific thereto, its reflection coefficient, its unevenness, etc. Therefore, very real images can be generated by determining optical information such as color and brightness to be assigned to pel (i, j) on screen 10 (FIG. 2).

Methods for calculating intersection points of rays and each object surface are classified into an algebraic method and a method of numerical analysis on the basis of the figure of an object to be displayed.

The algebraic method is the one used to directly find an intersection point as the solution of an equation, according to a formula for solution.

The method of numerical analysis is one for searching a region where an intersection point exists first by sampling points on ray L as shown in FIG. 4. If an equation for an equi-valued surface is represented by $F(X, Y, Z) = C$, check is made for sign of $[F(X, Y, Z) - C]$ on each sampled point to find a region where an intersection point exists, or a region where the sign changes (between sampled points 30 and 32 for the example of FIG. 4). Then, the intersection point is calculated for the region using the bisection method or the Newton method. In a case where the surface of the object to be displayed can be represented by a function of $F(X, Y, Z) = C$ of the fifth degree or higher, the method of numerical analysis using the sampling becomes essential.

Although the ray-tracing method can generally generate a high quality image, the amount of calculation becomes enormous because an intersection point with the surfaces of the objects needs to be found for each pel, respectively. Therefore, the following method for increasing speed is disclosed by, for example, Akira Fujimoto et. al. in "Accelerated Ray-Tracing System", IEEE CG & A, April 1986 or Japanese PUPA 61-139890.

(I) Grid space 33 as shown in FIG. 5 is considered. Information about which object exists in rectangular parallelepiped (cell) 34 obtained by dividing grid space 33 is stored into storage means in the form of table 35.

(II) For each ray it is judged whether or not it intersects the grid space. Then for a ray intersecting the grid space, it is determined which rectangular parallelepiped the ray intersects, and finally whether or not it intersects the surface of the object contained in the rectangular parallelepiped.

Description is made by referring to the example shown in FIG. 6. Ray A intersects a rectangular parallelepiped where an object exists (for example, rectangular parallelepiped 38 where object 36 exists), but ray B does not intersect a rectangular parallelepiped where an object exists, and no calculation is required for the intersection point with an object surface. Because it is not necessary to calculate the intersection point with an object surface for a rectangular parallelepiped which contains no object, it is possible to reduce the number of calculations of the intersection point. 40 in FIG. 6 is a plane of projection.

Here, it is noticed that the invention and the prior art are described by using a drawing represented two-dimensionally for convenience of description as in FIGS. 3 through 6.

Whether a ray intersects a grid space or not is determined by finding intersection points with six planes forming the surfaces of the grid space which is in a form of a rectangular parallelepiped, and by checking whether the intersection points are contained in the grid space or not. If there is an intersection point contained in the grid space, a rectangular parallelepiped which the ray first enters is determined from the intersection point nearest to the viewpoint.

A rectangular parallelepiped which the ray next enters can be determined only by incremental calculation based on the first rectangular parallelepiped and inclination of the ray. Now, description is made by referring to FIG. 7. The equation for the ray is expressed by $vt+s$ wherein inclination of ray is v, an intercept of the ray is s, and line parameter is t. In addition, it is assumed that the distance between X, Y and Z grids along the ray is dtx, dty and dtz, respectively, and that t parameter on X, Y and Z grid which the ray traverses next is tx, ty, tz, respectively. As shown in FIG. 7 that is represented two-dimensionally for convenience of the description, rectangular parallelepiped (i', j', k') which the ray enters next can be determined only by incrementing axis 1 (1=x, y, z), which has a minimum value among current tx, ty and tz, by 1 (+1 if the inclination is positive, −1 if it is negative). Once transfer to the next rectangular parallelepiped is made, dt1 (1=x, y, z) is added to t parameter t1 (1=x, y, z) for the axis. Then, rectangular parallelepipeds can be sequentially traversed by applying similar processing.

Now, in the case of the conventional method consisting of the above-mentioned (I) and (II), a rectangular parallelepiped completely included in an object to be displayed is registered and subject to sampling although an intersection point between the ray and the object surface cannot exist there. That is, as shown in FIG. 8, in a case where a ray passes through a transparent object having a plurality of rectangular parallelepipeds in grid space 42, sampling is performed for rectangular parallelepipeds 46 and 48 that do not require processing for searching the intersection point, which wastes time for that. This problem becomes serious particularly when it is necessary to generate images of a number of transparent objects.

SUMMARY OF THE INVENTION

It is an object of this invention to reduce the time for displaying an object in grid space by ray-tracing method.

The method for generating images according to the invention registers only a cell containing surface 50 of object 44 among cells that are obtained by dividing region 42 containing object 44 to be displayed, as shown in FIG. 1. The calculation of intersection points is performed only for rectangular parallelepipeds in which the surface exists. Thus, it is possible to reduce the time required for displaying object 44.

In the present invention, the region containing the object to be displayed or the cells obtained by dividing it may be a non-rectangular parallelepiped, but it is advantageous for them to be in the form of rectangular parallelepiped when implementation is considered. In the following, the former is simply called a grid space, the latter a rectangular parallelepiped.

DESCRIPTION OF THE PREFERRED EMBODIMENTS

Figure 1:
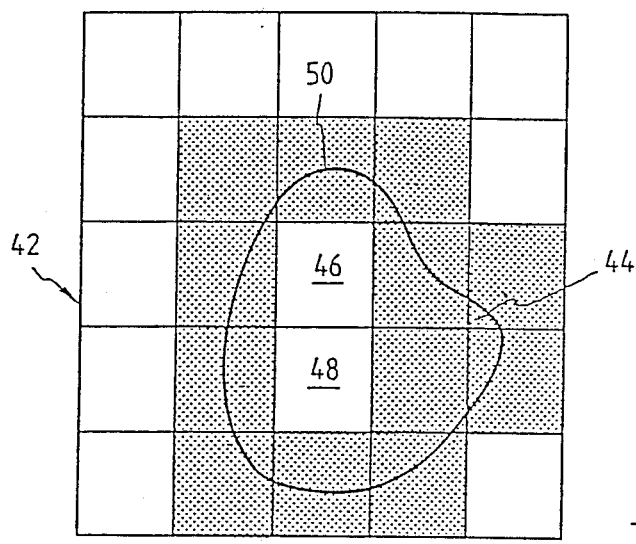
FIG. 1 is a diagram illustrating how to have information about an object for a grid space according to the invention.
Figure 8:
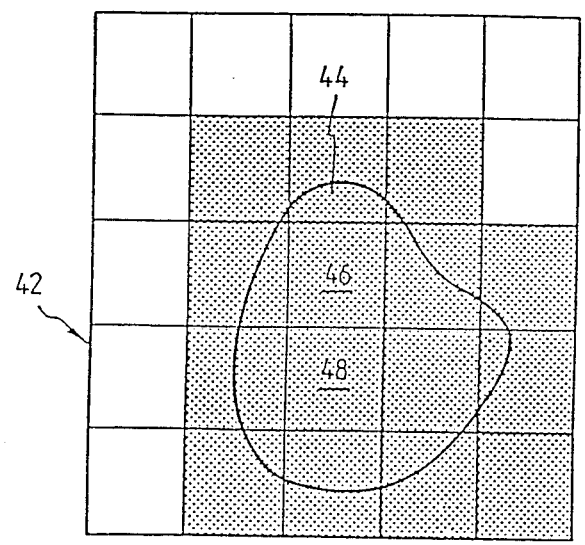
FIG. 8 is a diagram illustrating how to have information about an object for a grid space in a conventional way.
Figure 2:
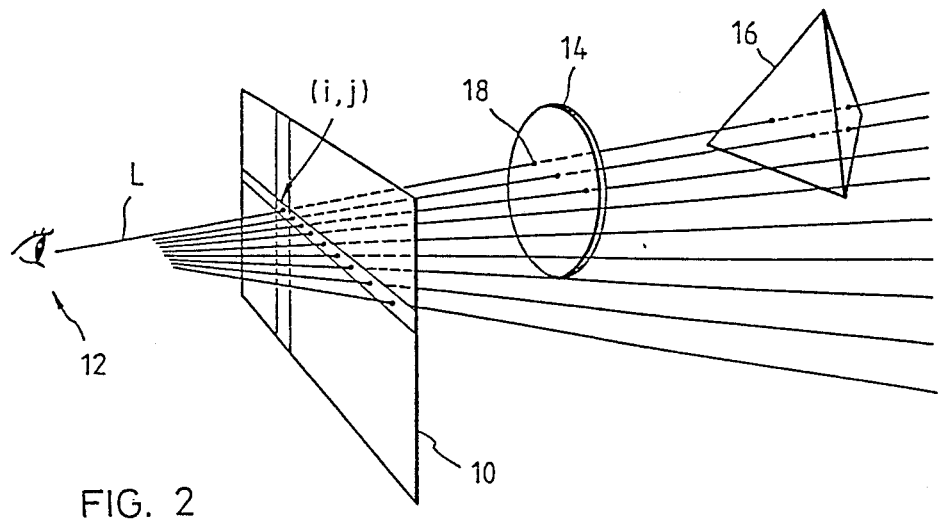
FIG. 2 is a diagram illustrating the concept of the ray-tracing method.
Figure 3:
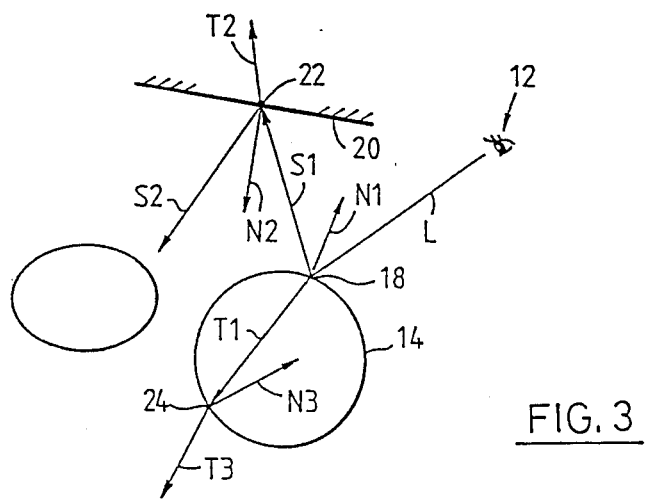
FIG. 3 is a diagram illustrating the tracing of rays reflected and refracted on the surface of an object.
Figure 4:
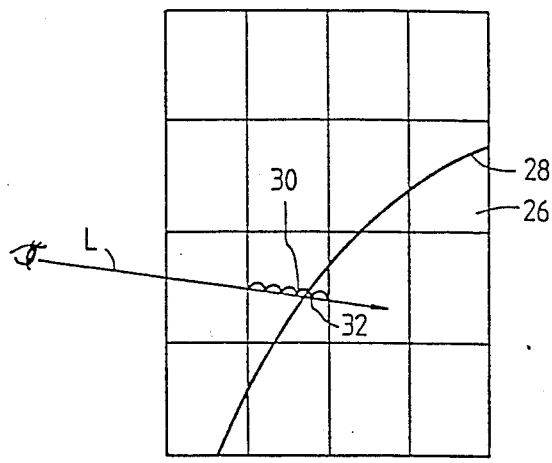
FIG. 4 is a diagram represented two-dimensionally, illustrating sampling according to a method of numerical value analysis.
Figure 5:
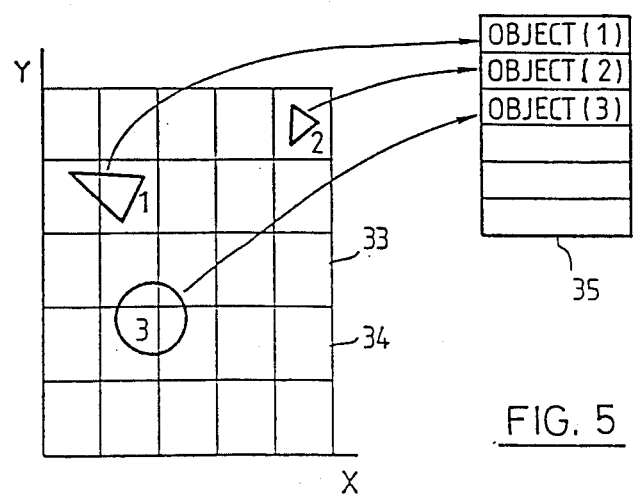
FIG. 5 is a diagram represented two-dimensionally, illustrating how to have information about an object for the divided grid space.
Figure 6:
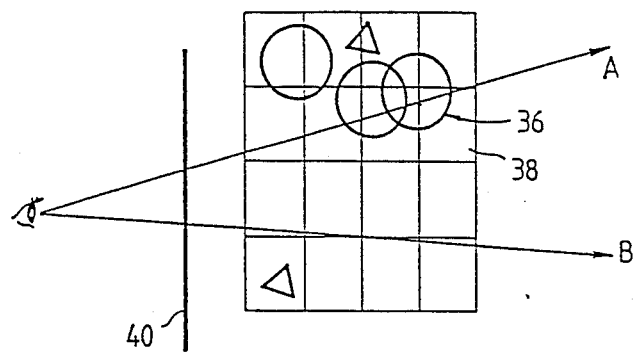
FIG. 6 is a diagram represented two-dimensionally, illustrating judgment of intersection with an object in the grid space.
Figure 7:
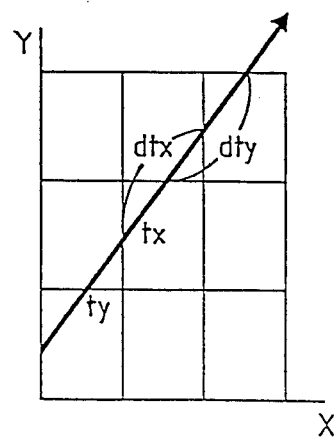
FIG. 7 is a schematic diagram of the judgment of intersection between a ray and a rectangular parallelepiped.

Description is made by taking as an example a case where the surface of an object is represented as one equi-valued surface. The equi-valued surface is a set of points satisfying F (X, Y, Z)=C for a function F (X, Y, Z) on a given space. First, it is necessary to find for each pel an intersection point between the ray and the equi-valued surface nearest to the viewpoint. This means to find smallest parameter t satisfying $$F (v_xt+s_x, v_yt+s_y, v_zt+s_z)=C \tag{1}$$

based on the ray equation vt+s and the equi-valued surface F (X, Y, Z)=C. Equation (1) has t as a variable. If equation (1) is a unitary quadratic equation, its root can be easily obtained from a formula. However, if the equation is of fifth degree or higher, its solution is generally impossible to obtain by an algebraic method, but is obtained by the technique of numerical value analysis. The invention covers a ray-tracing method that performs the calculation of the intersection point by the technique of numerical value analysis.

In the technique described below it is assumed that the equi-valued surface is given in a form of F (x, y, z)=C, and that the user provides a region where the equi-valued surface exists (Xmin, Ymin, Zmin _X, Y, Z_Xmax, Ymax, Zmax).

In the preprocessing, a space region containing the object is divided into rectangular parallelepipeds The reason why the parallelepiped division is used is that it reduces calculation on traversing the grid space compared with an octree structure. Here, the grid points are represented by (i, j, k) (i=1, Ni, j =1, Nj, K=1, Nk where Ni, Nj and Nk are the number of grids in x, y and z directions, respectively). A rectangular parallelepiped (i, j, k) means the one of which apexes are (i, j, k), (i+1, j, k) (i, j+1, k), (i, j, k+1), (i+1, j+1, k), (i+1, j, k+1), (i, j+1, k+1), (i+1, j+1, k+1). First, the region provided by the user where the object exists (Xmin, Ymin, Zmin≦X, Y, Z≦Xmax, Ymax, Zmax) is divided into Ni×Nj×Nk.

Then, each rectangular parallelepiped is classified into two spaces:
Space where the equi-valued surface exists Space where the equi-valued surface does not exist This is judged by the following method.

By obtaining the function value F (x, y, z) on each grid point (i, j, k), it is checked whether or not equi-valued surface exists in a rectangular parallelepiped (i, j, k) with grid points as the apexes. This is determined by relations of size between each function value in a rectangular parallelepiped and the constant C. That is, when F-C is calculated for eight apexes of the rectangular parallelepiped (i, j, k), and if at least one sign differs from others, the rectangular parallelepiped (i, j, k) is determined to be a space where the equi-valued surface exists. If the rectangular parallelepiped contains the surface, the rectangular parallelepiped is again divided into $Mi \times Mj \times Mk$, and then F-C is calculated for each apex after re-division. At a stage when it is found that for at least one apex a calculated sign differs, the rectangular parallelepiped (i, j, k) is registered as the space where the equi-valued surface exists. If each apex after the re-division has the same sign, it is determined that it is the space where the equi-valued surface does not exist.

Figure 9:
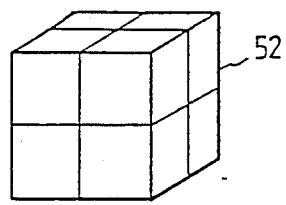
FIG. 9 is a perspective diagram illustrating a case where a rectangular parallelepiped is divided into eight pieces.
Figure 10:
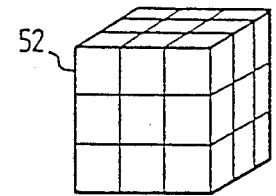
FIG. 10 is a perspective diagram illustrating a case where a rectangular parallelepiped is divided into twenty-seven pieces.
Figure 11:
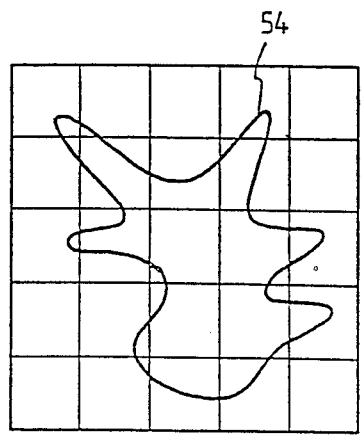
FIG. 11 is a two-dimensional diagram illustrating a case where the locality of the equi-valued surface is significant.

How many pieces each rectangular parallelepiped (i, j, k) is divided into also depends on the locality of the equi-valued surface, but it is generally sufficient that rectangular parallelepiped 52 is divided into eight pieces (Mi=Mj=Mk=2) as shown in FIG. 9 if the values of Ni, Nj and Nk are large (Ni, Nj, Nk>20) and the region is properly specified, and that it is divided into as many as twenty-seven pieces (Mi =Mj=Mk=3) if the values of Ni, Nj and Nk are small. If equi-valued surface 54 as shown in FIG. 11 has a significant locality, the values of Mi, Mj and Mk are made larger.

Because the grid space is surrounded by six planes represented as equation, X=Xmin, Y=Ymin, Z=Zmin, X=Xmax, Y=Ymax, Z=Zmax, it is sufficient to search the intersection point between the ray and each plane algebraically, and to check that the value is contained in the grid space. The rectangular parallelepiped which the ray first enters is determined from the intersection point nearest to the viewpoint among those contained in the grid space.

The rectangular parallelepiped which the ray intersects can be determined only by calculation of increment based on the first rectangular parallelepiped and the inclination of the ray. Description of this is omitted because it is already described in a section of the prior art. For the rectangular parallelepiped where the equi-valued surface exists, sampling is performed for points on the ray contained in the rectangular parallelepiped, for each of which function value F is calculated. A sampling width of about 1/20 or less of the maximum width of the rectangular parallelepiped has been judged to be sufficient from experience.

Figure 12:
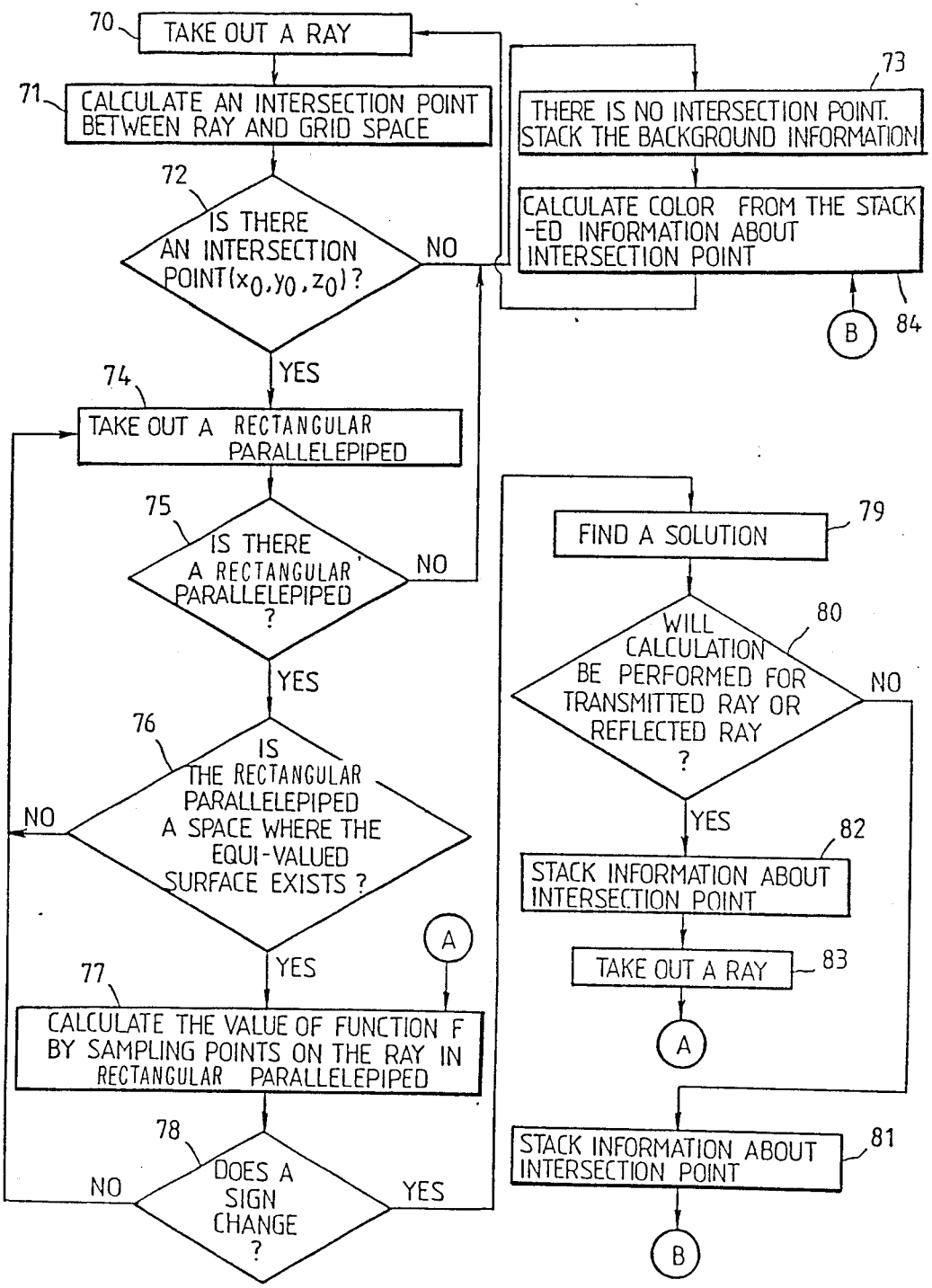
FIG. 12 is a flowchart illustrating an entire flow of the technique according to the invention.
Figure 13:
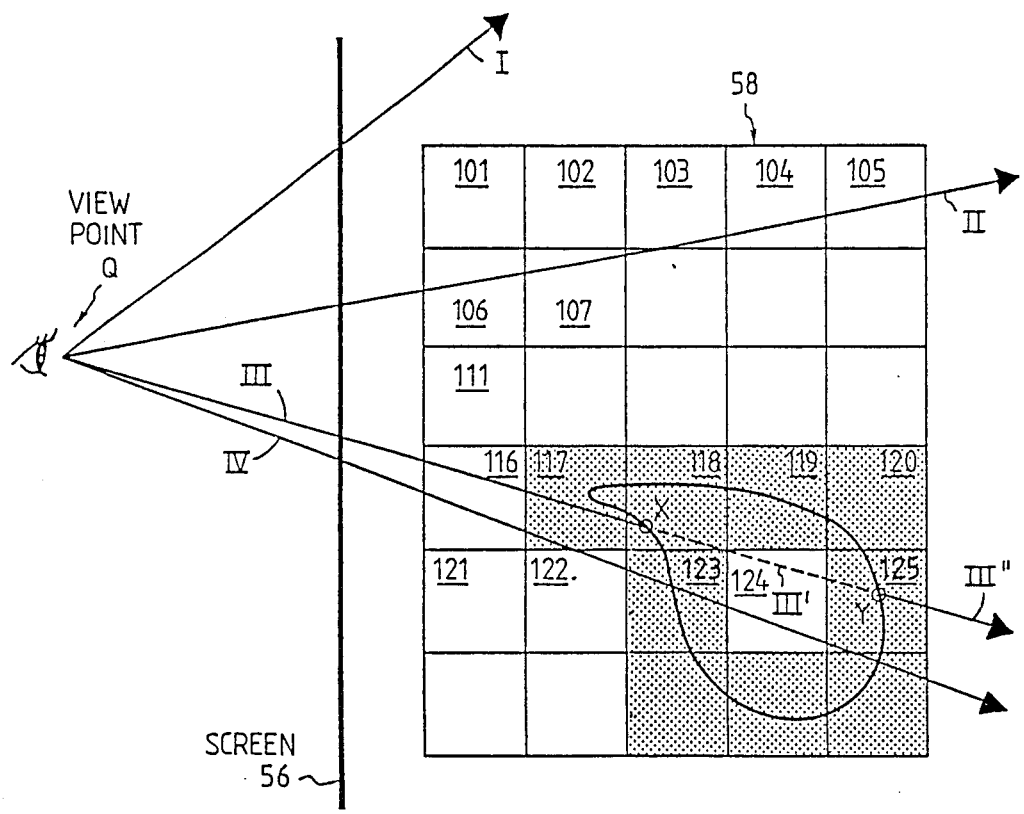
FIG. 13 is a diagram representing the sectioned grid space where the equi-valued surface exists.

FIG. 12 shows an entire flow. In the following, the image generation algorithm is described in detail by referring to FIG. 13. By the preprocessing, the rectangular parallelepipeds contained in the grid space are classified into those where the equi-valued surface exists and those where the equi-valued surface does not exist. The flow of the algorithm is described by exemplifying rays I, II, III and IV from viewpoint Q. In this example, only color is assumed as the optical information assigned to pels on screen 56 (FIG. 13).

(Case 1: Ray I)

Because ray I does not intersect the grid space, it is processed by the flow of blocks 70 —>71 —>72 —>73 —>84. It terminates after the color is calculated from the information stacked in block 84. The color is background one because it does not intersect the grid space. Then, the process for next ray is performed.

(Case 2: Ray II)

Because ray II intersects the grid space but does not intersect a rectangular parallelepiped where the equi-valued surface exists, the processing is performed in a flow of blocks 70 —>71 —>72 —>74 (taking out of rectangular parallelepiped 106 —>75 —>76 —<74 (taking out of rectangular parallelepiped 107), and then by repeating a flow of blocks 75 —>76 —>74 . . . . When rectangular parallelepipeds to be taken out in block 75 are exhausted, the flow enters block 73 to stack a background color, and then enters block 84. Then, the process for the next ray is performed.

(Case 3: Ray III)

For ray III, rectangular parallelepiped 116 is taken out by a flow of blocks 70 —>71 —>72 —>74 —>75 —>76, and checked for whether there is the equi-valued surface or not. Because the equi-valued surface does not exist in rectangular parallelepiped 116, the next rectangular parallelepiped 117 is taken out by a flow of blocks 74 —>75 —>76. Because the equi-valued surface exists in rectangular parallelepiped 117, the flow enters block 77 to perform the sampling. In this case, since ray III and the equi-valued surface in rectangular parallelepiped do not intersect with each other and there is no change of sign, rectangular parallelepiped 118 is taken out by a flow from block 78 to blocks 74 —>75 —>76. Because rectangular parallelepiped 118 also has the equi-valued surface, the flow enters block 77 to perform the sampling. However, because the sign changes during the sampling, it enters block 79. Because a solution exists in this region on the basis of the intermediate-value theorem, intersection point X is found by a method such as the bisection method or the Newton method.

In a case where the object does not cause reflection or transmission, the flow enters block 81 to stack the information on intersection point, and then enters block 84.

In a case where the object causes reflection or transmission, ray III' is supposed in the direction of the reflection or transmission from intersection point X. The ray is processed in a manner similar to that described for ray III. The process of the calculation for the intersection point according to the invention is described by exemplifying a case where the object in FIG. 13 is transparent. Transmitted ray III' starts from intersection point X and traverses rectangular parallelepipeds 118, 124 and 125. Therefore, the flow from block 80 passes through blocks 82 —>83 (taking out of refracted ray III' with orientation slightly different from III) —>77 —>78, and enters block 74 to take out rectangular parallelepiped 124. However, because rectangular parallelepiped 124 is not a space where the equi-valued surface exists, useless sampling is not performed, and rectangular parallelepiped 125 is taken out by a flow of blocks 75 —>76 —>74. Because rectangular parallelepiped 125 is a space where the equi-valued surface exists, the flow passes through blocks 76 —>77 —>78 —>79, and a new intersection point Y is obtained. Because further calculation is performed for the transmitted ray in the block, the flow enters block 82 to stack the information of intersection point Y, and passes through blocks 83 —>77 —>78 —>74 —>75. In block 75, there is no next rectangular parallelepiped. Then the flow enters block 73, and finally the color calculation is performed in block 84 from the stacked information on intersection points (here, information about intersection points X and Y, and background). Then, the process for next ray IV is performed.

The invention applied to the following equi-valued surface, and measurement was made for the number of division vs. the CPU time required until image data is generated on the main memory after reading data. The function used was:

$$F(X, Y, Z) = (X^2 + Y^2 - 1)^2 + 4 \cdot Z^2 + 0.5 \cdot X = C$$

Figure 14:
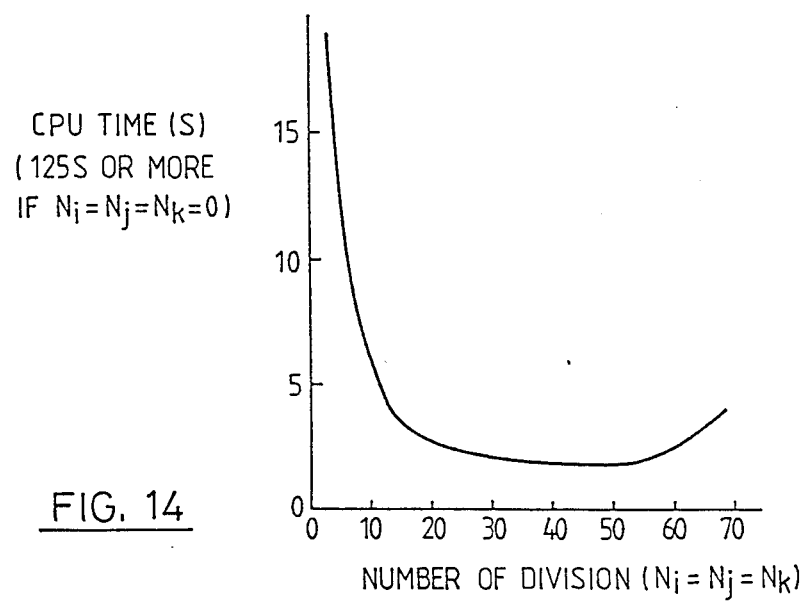
FIG. 14 is a graph illustrating the processing time according to the invention, varying the number of divisions of the grid space.
Figure 15:
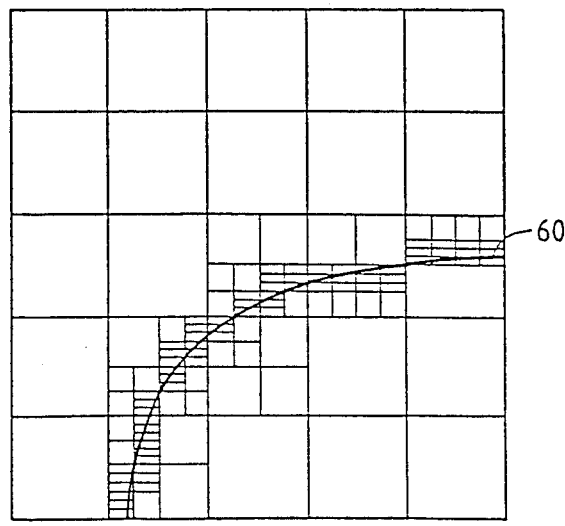
FIG. 15 is a diagram represented two-dimensionally, illustrating a case where the grid space is unevenly divided.

FIG. 14 shows measured processing time. The number of pels on the screen was 512×512. The measurement was made for the number of division $Ni=Nj=Nk=0, 4, 8, 15, 30, 45$ and 60. The number of division 0 means a case where the ray-tracing method is directly used without the technique of the invention. It is realized that high quality images can be displayed more quickly by way of the present technique. In addition, this technique is so simple that hardware can be easily configured.

Although, in the above, the description is made for a case where the surface of the object is represented as one equi-valued surface, the present invention can also apply to a case where the surface of the object is comprised of a plurality of equi-valued surfaces that differ in dependence on position. In addition, information about the surface of the object may be acquired in an unequal division technique, that is, in a manner where a rectangular parallelepiped with the surface of the object is divided more finely than that without it for checking existence of the surface.

According to the invention, it becomes possible to perform the ray-tracing at higher speed than with the conventional technique. The invention is particularly effective in performing analysis of a simulation by displaying an object with a transparent equi-valued surface.

I claim:

1. In a system for generating images where processing means, display means, and storage means are provided, a method for generating images of at least one object to be projected on a projective plane, on a screen of said display means which corresponds to the projective plane, using a ray-tracing method, which comprises the following steps:
(a) (a1) supposing a viewpoint, supposing a ray which passes the viewpoint and a point on the projective plane which corresponds to a pel for each pel on the screen and searching an intersection where the ray meets a surface of said at least one object which is nearest to the viewpoint for each supposed ray, and
(a2) if the desired point is obtained, repeating a step at least once which comprises supposing at least one of the reflected ray and the transmitted ray which starts from the intersection obtained in the preceding search and searching an intersection where the supposed ray meets a surface of said at least one object which is nearest to the intersection obtained in the preceding search, and
(b) with respect to the supposed ray which passes said viewpoint and a point on said projective plane which corresponds to a pel on the said screen, if at least one intersection is obtained through the search as described in (a) which begins with said ray, determining optical information to be assigned to the pel associated with said ray in consideration of the attribute of said at least one intersection, if no intersection is obtained through the search as described in (a), assigning optical information which corresponds a background of said at least one object to the pel associated with the said ray, characterized by
(I) prior to the step (a1),
 (i) defining a space region which contains said at least one object to be displayed,
 (ii) dividing said space region into a plurality of cells,
 (iii) determining whether the cell contains at least one surface of said at least one object or not for each cell, and if the cell contains the said at least one surface, registering the cell in a table provided in said storage means,
(II) in the step (a1), determining whether the ray intersects said space region or not by calculation prior to performing the calculation for an intersection for each supposed ray,
and ending the search for an intersection for the ray which doesn't intersect said space region, under a decision that the ray intersects no surface of said at least one object, (III) in the steps (a1) and (a2),
identifying the cell which the ray intersects for each ray that intersects said space region by calculation, collating the identified cell with said table, and if the identified cell is found to contain the surface of said at least one object, searching an intersection where the ray meets the surface in the cell in a numerically analytic way which uses sampling,
and if the identified cell is found to contain no surface of the said at least one object, ending the search for an intersection where the ray meets the surface in the cell, under a decision that the ray intersects no surface of said at least one object there.

2. A method as described in claim 1, wherein in the said step (ii), said space region is divided into a plurality of cells each in the form of a rectangular parallelepiped.

3. A method as described in claim 1 or 2, wherein
in the step (iii), redividing a cell which contains a surface of said object to be displayed into cells in the form of a smaller rectangular parallelepiped, determining for each redivided cell whether a surface of said object to be displayed exists there or not, and registering only the redivided cell that contains said surface in said table.

4. A method as described in claim 3, wherein the optical information to be assigned to each of said pels is color and brightness.

5. A method as described in claim 2, wherein the optical information to be assigned to each of said pels is color and brightness.

6. A method as described in claim 1, wherein the optical information to be assigned to each of said pels is color and brightness.

7. A method of generating a two-dimensional image of a three-dimensional object viewed from a viewpoint, said object having a surface, said method comprising the steps of:
defining a space region which contains the object;
dividing the space region into a number of cells;
determining which cells contain portions of the surface of the object;
defining a plane having a plurality of image elements, each image element corresponding to a picture element of a display;

defining a plurality of primary rays, each primary ray being defined as a straight line beginning at the viewpoint and passing through one image element, each primary ray being associated with a picture element corresponding to the image element through which the primary ray passes;

then, for each primary ray:

determining whether the primary ray intersects cells in the space region containing the object;

only if the primary ray intersects one or more cells in the space region containing the object, then finding one or more intersected cells which contain a portion of the surface of the object;

only if the primary ray intersects a cell which contains a portion of the surface of the object, then for the intersected cell which is closest to the viewpoint, determining a point of intersection within said cell between the primary ray and the surface of the object, said point of intersection having an attribute;

defining a secondary ray as a straight line beginning at the intersection between the primary ray and the surface of the object, said secondary ray extending in a direction corresponding to a reflection or refraction of the associated primary ray at the surface of the object, the secondary ray being associated with the picture element associated with the primary ray;

determining cells in the space region containing the object which are intersected by the secondary ray;

then finding one or more intersected cells which contain a portion of the surface of the object;

only if the secondary ray intersects a cell which contains a portion of the surface of the object, then for the intersected cell which is closest to the intersection between the primary ray and the surface of the object, determining a point of intersection within said cell between the secondary ray and the surface of the object, said point of intersection having an attribute; and displaying at least one picture element with an attribute determined by the attributes of the intersections between the associated primary and secondary rays and the surface of the object.

8. A method as claimed in claim 7, wherein the object comprises two or more separate sub-objects with unconnected surfaces.

9. A method as claimed in claim 8, wherein each cell is a rectangular parallelepiped.

10. A method as claimed in claim 9, wherein the step of determining which cells contain portions of the surface of the object comprises the steps of:

determining which cells of a fist size contain portions of the surface of the object;

dividing each cell of the first size which contains a portion of the surface of the object into a number of cells of a second size smaller than the first size; and determining which cells of the second size contain portions of the surface of the object.

11. A method as claimed in claim 8, wherein the step of determining which cells contain portions of the surface of the object comprises the steps of:

determining which cells of a first size contain portions of the surface of the object;

dividing each cell of the first size which contains a portion of the surface of the object into a number of cells of a second size smaller than the first size; and determining which cells of the second size contain portions of the surface of the object.

12. A method as claimed in claim 7, wherein the step of determining which cells contain portions of the surface of the object comprises the steps of:

determining which cells of a first size contain portions of the surface of the object;

dividing each cell of the first size which contains a portion of the surface of the object into a number of cells of a second size smaller than the first size; and determining which cells of the second size contain portions of the surface of the object.

* * * * *